(12) United States Patent
Krivitski et al.

(10) Patent No.: US 8,964,542 B1
(45) Date of Patent: *Feb. 24, 2015

(54) METHOD AND APPARATUS FOR PACKET PROCESSING

(71) Applicant: Marvell Israel (M.I.S.L) Ltd., Yokneam (IL)

(72) Inventors: Denis Krivitski, Nazareth Illit (IL); Carmi Arad, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/133,086

(22) Filed: Dec. 18, 2013

Related U.S. Application Data (63) Continuation of application No. 12/109,703, filed on Apr. 25, 2008, now Pat. No. 8,619,562.

(60) Provisional application No. 60/914,176, filed on Apr. 26, 2007.

(51) Int. Cl.
| | | |
|---|---|---|
| *G01R 31/06* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04L 12/741* | (2013.01) | |

(52) U.S. Cl.
CPC ...................................... *H04L 45/74* (2013.01)

USPC ............ 370/230; 370/235; 370/389; 370/392

(58) Field of Classification Search
USPC .............. 370/230, 235, 389, 392; 710/36, 51, 710/240; 726/26
See application file for complete search history.

(56) References Cited

U.S. PATENT DOCUMENTS

| | | |
|---|---|---|
| 6,298,340 B1 | 10/2001 | Calvignac et al. |
| 6,449,656 B1 | 9/2002 | Elzur et al. |
| 6,658,002 B1 | 12/2003 | Ross et al. |
| 6,691,168 B1 | 2/2004 | Bal et al. |
| 6,717,946 B1 | 4/2004 | Hariguchi et al. |
| 6,775,081 B2 | 8/2004 | Ottesen et al. |

(Continued)

OTHER PUBLICATIONS

Bremler-Barr, et al., "Space-Efficient TCAM-based Classification Using Gray Coding," INFOCOM 2007, pp. 1388-1396, 2007.

(Continued)

*Primary Examiner* — Benjamin H Elliott, IV (57) ABSTRACT

Aspects of the disclosure provide a method for processing packet with a reduced hardware cost. The method for processing packet can include selecting a group of parameter ranges based on information contained within a packet, determining a search key based on the packet and whether a parameter of the packet is within one or more of the parameter ranges, determining a rule based on the search key corresponding to the packet and the group of parameter ranges, and executing an action that is associated with the rule on the packet. In addition, the disclosure provides an apparatus for processing packet. Further, the disclosure provides a packet switching device that can apply policy on a packet based on parameters of the packet and ranges among a group of ranges, within which a parameter of the packet belongs.

26 Claims, 11 Drawing Sheets

(56) References Cited

U.S. PATENT DOCUMENTS

| | | |
|---|---|---|
| 6,839,800 B2 | 1/2005 | Stark |
| 7,061,874 B2 | 6/2006 | Merugu et al. |
| 7,093,092 B2 | 8/2006 | Stojancic |
| 7,304,992 B2 | 12/2007 | Relan |
| 7,457,292 B2 | 11/2008 | Asano |
| 7,492,763 B1 | 2/2009 | Alexander, Jr. |
| 7,668,160 B2 | 2/2010 | Narayan et al. |
| 7,711,893 B1 | 5/2010 | Venkatachary |
| 7,724,740 B1 | 5/2010 | Wang et al. |
| 2002/0191605 A1 | 12/2002 | Lunteren et al. |
| 2003/0191740 A1 | 10/2003 | Stark |
| 2004/0258043 A1 | 12/2004 | Engbersen et al. |
| 2006/0114908 A1 | 6/2006 | Kalkunte et al. |
| 2006/0155915 A1 | 7/2006 | Pereira |

OTHER PUBLICATIONS

Sep. 13, 2010 Office Action issued in U.S. Appl. No. 12/109,711.
Apr. 14, 2010 Office Action issued in U.S. Appl. No. 12/109,711.

| CONFIGURATION | RANGES |
|---|---|
| 000001 | $[R_{10}]$ $[R_{11}]$ $[R_{12}]$ $[R_{13}]$ $[R_{14}]$ $[R_{15}]$ |
| 001001 | $[R_{20}]$ $[R_{21}]$ $[R_{22}]$ $[R_{23}]$ $[R_{24}]$ $[R_{25}]$ $[R_{26}]$ $[R_{27}]$ |
| 001100 | |
| 101010 | |

|        | VLAN | SOURCE TCP PORT |
|--------|------|-----------------|
| RULE 1 | 2    | [0      10]     |
| RULE 2 | 2    | [16      17]    |

FIG. 11A

CONFIGURATION TABLE

| VLAN | CONFIGURATION | |
|------|---------------|---|
| 1    | 000001        | 1110 |
| 2    | 001001        | → {001001,0}  TCP / 11C |

FIG. 11B

RANGE CONFIGURATION DATABASE

| | 7 | 6 | 5 | 4 | 3 | 2 | 1 | 0 |
|---|---|---|---|---|---|---|---|---|
| 0010010 | 0,10,S | 20,30,D | 40,50,S | 60,70,D | 80,90,S | 0,200,S | 0,100,D | 0,300,S |

TCAM

|  | SOURCE PORT | | | DESTINATION PORT | | | RANGE CONDITION VECTOR |
|---|---|---|---|---|---|---|---|
| RULE 1 | REST ENTRY | xxxx 0000 | 0000 xxxx | xxxx xxxx | xxxx xxxx | xxxx 1xxx | xxxx |
| RULE 2 | REST ENTRY | 0000 | 0001 | 000X xxxx | xxxx xxxx | xxxx xxxx | xxxx |

FIG. 11E

| SEARCH KEY | SOURCE PORT | | | DESTINATION PORT | | | RANGE VECTOR |
|---|---|---|---|---|---|---|---|
| REST KEY | 0000 | 0000 | 1000 | 0000 | 0000 | 1100 | 1000 0111 |

FIG. 12

METHOD AND APPARATUS FOR PACKET PROCESSING

INCORPORATION BY REFERENCE

This is a continuation of U.S. application Ser. No. 12/109,703, filed on Apr. 25, 2008, which claims the benefit of U.S. Provisional Application No. 60/914,176, filed on Apr. 26, 2007. The disclosures of the applications referenced above are incorporated herein by reference.

BACKGROUND

Policies and rules are widely used in network applications. For example, conventionally, policies may be used to statistically multiplex packets. Further, network applications, such as packet routing, packet classification, access control for network security, virtual local network (VLAN), and the like, may utilize policies and rules to provide quality of service (QoS). For example, a VLAN membership can be based on a subnet field and a protocol port number. Therefore, a packet switching device may include policies and rules that check the subnet field and the protocol port number of a packet to direct a transmission of the packet.

A policy may include one or more rules. Each rule can generally include one or more conditions, as well as an action that is associated with the conditions. The action can be applied when the conditions are satisfied. In a software based rule testing technique, rules can be implemented in software as conditional statements, such as "CASE" statement. The conditional statements can be executed by a processor to test a packet against a predefined set of rules. However, such software based rule testing techniques can result in a bottleneck for packet switching, as a result of insufficient fast software execution speed.

SUMMARY

Hardware based policy applying techniques, such as using ternary content addressable memory (TCAM), can be utilized to improve packet switching speed. However, certain policies, such as policies including a range condition that tests if a parameter belongs to a range, can be costly for hardware based policy applying techniques. Aspects of the disclosure can provide a method for packet processing with a reduced hardware cost. The method for packet processing can include selecting a group of parameter ranges, determining a search key based on the packet and whether a parameter of the packet is within one or more of the parameter ranges, determining a rule based on the search key corresponding to the packet and the group of parameter ranges, and executing an action that is associated with the rule on the packet.

According to an aspect of the disclosure, the information for selecting the group of parameter ranges can include a virtual local area network (VLAN) identification. Further, the method can include storing groups of parameter ranges in association with VLAN identifications.

To determine the search key based on the packet and whether the parameter of the packet is within one or more of the parameter ranges, the method can further include comparing the parameter of the packet with each parameter range of the group to determine within which of the parameter ranges the parameter belongs. Subsequently, to compare the parameter of the packet with the each parameter range of the group to determine within which of the parameter ranges the parameter belongs, the method can include comparing the packet parameter with an upper limit of the each parameter range of the group, comparing the packet parameter with a lower limit of the each parameter range of the group, and determining that the packet belongs to the parameter range if the packet parameter is smaller than or equal to the upper limit and larger than or equal to the lower limit.

Additionally, to determine the rule based on the search key, the method can include comparing the search key with rules stored in association with the group of parameter ranges.

According to an aspect of the disclosure, the rules in association with the group of parameter ranges can be stored in a memory unit that includes a ternary content addressable memory (TCAM).

Aspects of the disclosure can also provide an apparatus for processing packet. The apparatus can include a key constructor configured to construct a search key based on parameters of a packet and indications of ranges among a group of ranges within which a parameter of the packet belongs, a rule tester coupled to the key constructor, the rule tester being configured to determine a rule that the search key satisfies the rule, and a packet handler coupled to the rule tester, the packet handler being configured to execute an action associated with the rule on the packet.

Additionally, aspects of the disclosure can also provide a packet switching device. The packet switching device can include an interface coupled to an outer link, and a packet processor coupled to the interface. The interface can be configured to receive a packet from the outer link. The packet processor can be configured to process the packet. Further, the packet processor can include a key constructor configured to construct a search key based on parameters of a packet and indications of ranges among a group of ranges within which a parameter of the packet belongs, a rule tester coupled to the key constructor, the rule tester being configured to determine a rule that the search key satisfies the rule, and a packet handler coupled to the rule tester, the packet handler being configured to execute an action associated with the rule on the packet.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Aspects of the disclosure can provide hardware based policy applying techniques that can apply a policy to deterministically multiplex packets based on parameters of the packets. The policy may include a rule that has a range condition. Therefore, an action of the rule can be applied to a packet when parameters of the packet satisfy conditions, including the range condition, of the rule.

Hardware based policy applying techniques, such as using ternary content addressable memory (TCAM), can be utilized to improve packet switching speed. For example, a packet switching device can include a TCAM to store rules. Each of the rules can be stored using one or more TCAM entries. When the packet switching device receives a packet, parameters of the packet can be compared to every entry of the TCAM at the same time to find a rule that the parameters satisfy conditions of the rule. Therefore, packet switching speed can be greatly improved.

However, certain rules, such as rules including a range condition that tests if a parameter belongs to a range, can be costly for hardware based policy applying techniques. In a technique, prefix-expansion can be used to utilize a number of TCAM entries to represent a range. However, some rules may require a large number of TCAM entries to fully cover a range. For example, a range [1-65534] may require 30 TCAM entries using the prefix-expansion technique. A large number of TCAM entries may increase network device cost. The disclosure can provide a method for implementing policies in hardware, such as TCAM, with a reduced footprint.

Figure 1:
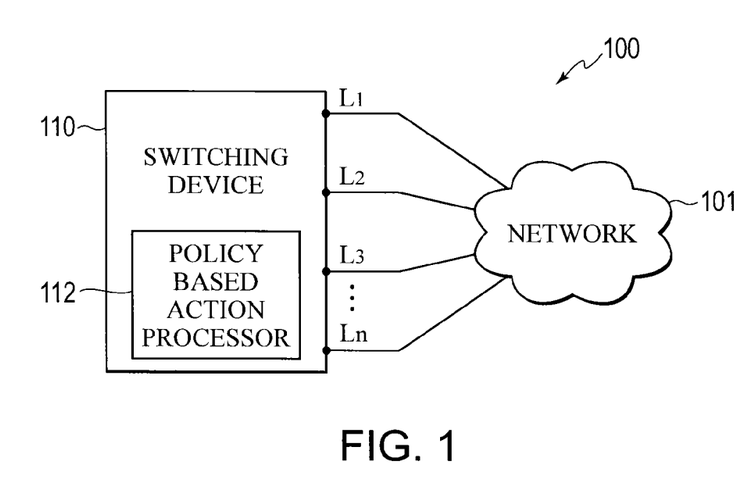
FIG. 1 shows an example of a network system.

FIG. 1 shows an example of a network system. The network system 100 can include a network 101 and a network switching device 110 coupled by communication links $L_1$ to $L_n$. The network 101 can send a packet to the network switching device 110 via one of the communication links $L_1$ to $L_n$. The network switching device 110 can perform packet processing, such as permitting packet transmitting within a VLAN, according to the disclosure.

The network 101 can be wired, wireless, a local area network (LAN), a wide area network (WAN), a peer-to-peer network, the Internet, etc. or any combination of these that couples to the network switching device 110. The communication link $L_1$ to $L_n$ can be any type of wired or wireless link, including, but not limited to, multiple twisted pair cables, DSL, coaxial cable, fiber optics, RF cable modems, over-the-air frequency, over-the-air optical wavelength (e.g. infrared), satellite transmission, simple direct serial/parallel wired connections, or the like, or any combinations of these.

The network switching device 110 can include hardware based policy applying techniques, such as a policy based action processor 112, which in accordance with an embodiment of the disclosure, employs a reduced quantity of memory entries, to apply policies on a packet based on parameters of the packet. For example, the network switching device 110 can include a TCAM to store one or more rules of a policy. According to the disclosure, conditions of a rule, including a range condition, can be stored using a reduced number of TCAM entries. Accordingly, hardware footprint and cost can be reduced. Further, the network switching device 110 can receive a packet, and test whether the packet satisfies rule conditions by matching parameters of the packet with the reduced number of TCAM entries. When the packet parameters match one of the reduced number of TCAM entries, the network switching device 110 can perform an action associated with the matching entry.

Figure 2:
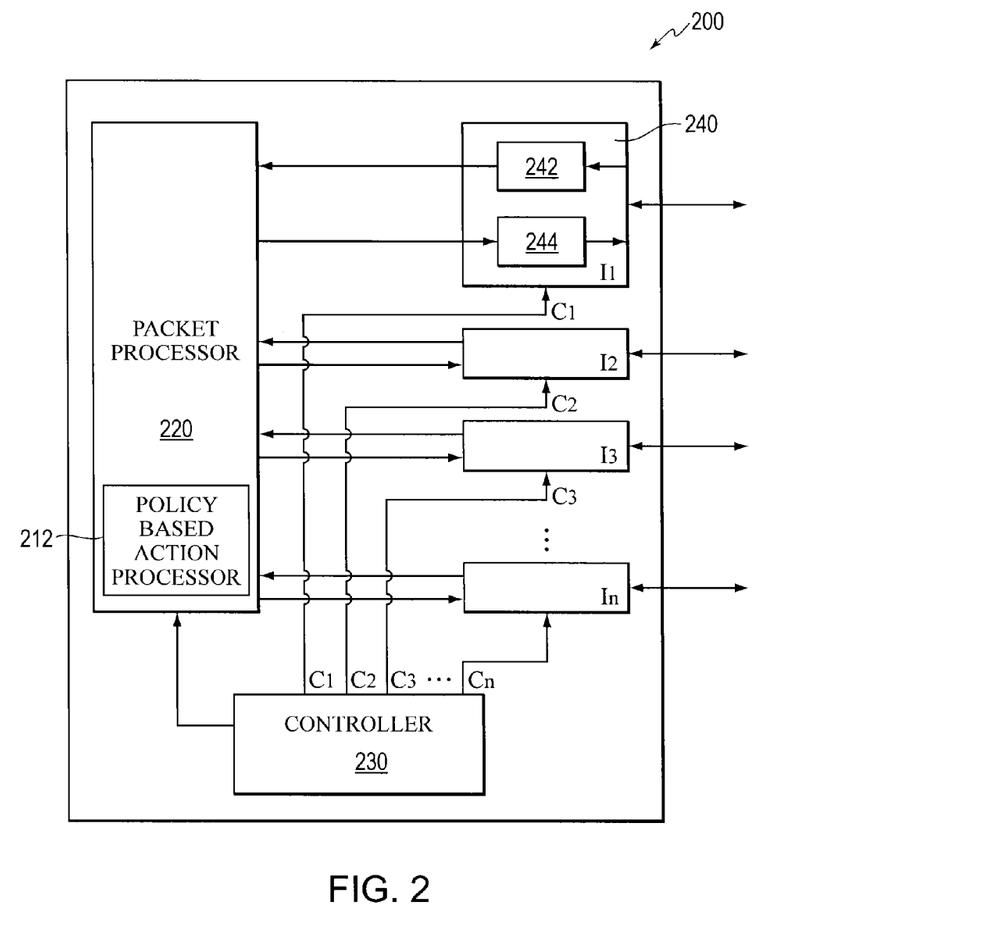
FIG. 2 shows an example of a network switching device.

FIG. 2 shows a detailed example of a network switching device. The network switching device 200 can include a plurality of port interfaces, such as $I_1$-$I_n$, a packet processor 220 and a controller 230. These elements can be coupled together as shown in FIG. 2, for example. The plurality of port interfaces $I_1$-$I_n$ can provide communication interfaces between outer links and the packet processor 220. The port interfaces $I_1$-$I_n$ can receive packets, and transfer the packets to the packet processor 220. The packet processor 220 can make decisions of how to process the packets based on parameters of the packets, and operate accordingly. The controller 230 can provide control signals to the packet processor 220 and the port interfaces $I_1$-$I_n$ to enable the network switching device 200 operations.

A port interface of $I_1$-$I_n$ can be configured based on communication requirements of an outer link and the packet processor 220. For example, the port interface 240 can include an input interface 242 that can receive data from the outer link and send data to the packet processor 220, and an output interface 244 that can receive data from the packet processor 220 and send data to the outer link. Therefore, the port interface 240 can be configured to provide bilateral direction communications.

The packet processor 220 can further include a policy based action processor 212, which in accordance with an embodiment of the disclosure employs a reduced quantity of memory entries, that can use policies to deterministically multiplex a received packet based on parameters of the received packet. A policy may include one or more rules. Each rule can include rule conditions, as well as a rule action that is associated with the rule conditions. According to the disclosure, the policy based action processor 212 can include a rule, which has a range condition, that may require a parameter of the packet to satisfy the range condition. For example, a rule example can be expressed in plain English as "permit forwarding packet with source subnet address 192.168.X.X, VLAN identification 2, and source TCP port between 0 to 10." The rule example includes a VLAN condition—"VLAN identification 2", a subnet condition—"source subnet address 192.168.X.X" and a source TCP port condition—"source TCP port between 0 to 10." The source TCP port condition is based on ranges of source TCP port. The rule example also includes a rule action "permit forwarding" associated with the rule conditions. The policy based action processor 212 can execute the action on a packet when the packet satisfies the rule conditions.

The policy based action processor 212 can use one or more hardware entries, such as TCAM entries, to implement policies and rules that can multiplex packets based on parameters of the packets. According to the disclosure, the policy based action processor 213 can implement rules with a reduced number of hardware entries. Thus, hardware cost can be reduced.

Further, the policy based action processor 212 can receive a packet, and compare parameters of the packet with the hardware implemented rule conditions to find a rule that the packet parameters satisfy the rule conditions. For example, the policy based action processor 212 may receive a packet having IP address 192.168.5.236, VLAN identification 2, and source TCP port 8. Parameters of the packet satisfy the subnet condition, VLAN condition, and the source TCP port condition of the above rule example. Therefore, the policy based action processor 212 can perform the associated action "permit forwarding" on the packet. Consequently, the packet can be forwarded.

The controller 230 can perform various functions to enable the port interface $I_1$-$I_n$ and the packet processor 220 to work properly. For example, the controller 230 may control the packet processor 220 to update policies and rules, such as insert a new rule, delete an old rule, and the like.

Figure 3:
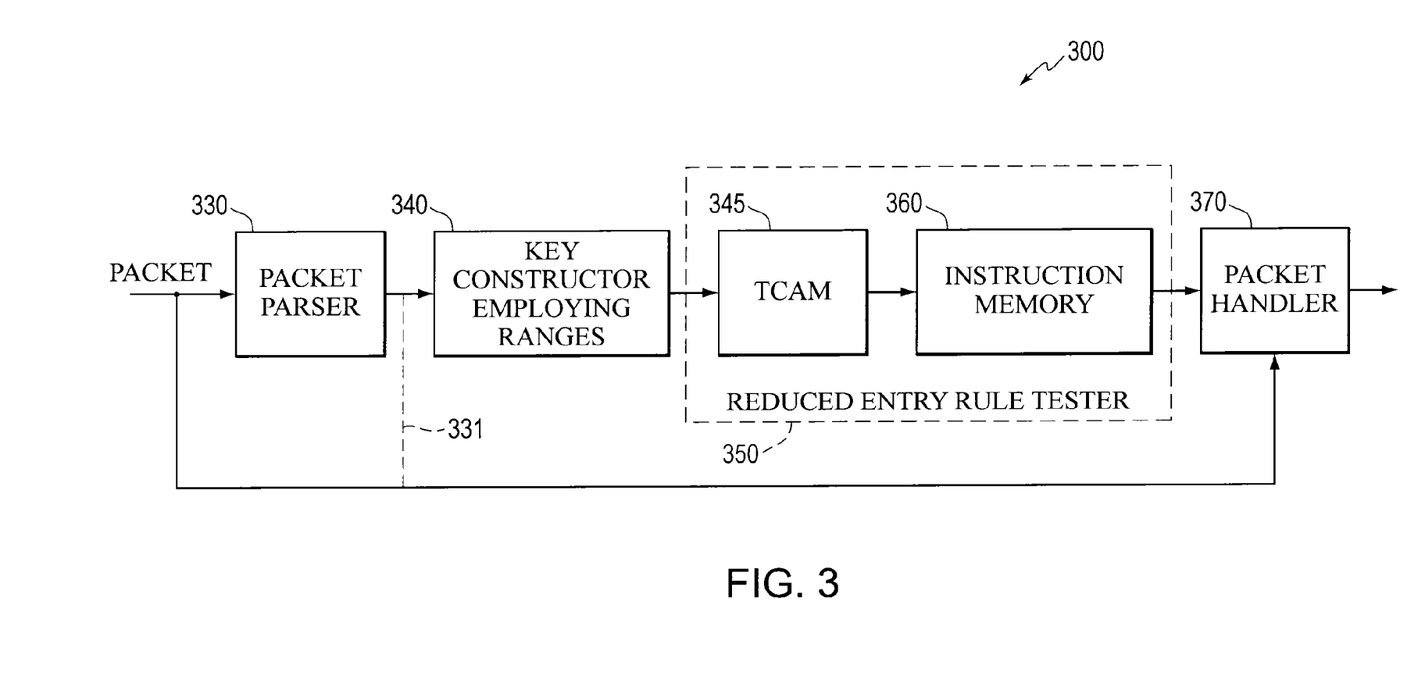
FIG. 3 shows an example of a packet processor.

FIG. 3 shows an example of a packet processor. The packet processor 300 can make decisions for further actions on a packet based on parameters of the packet, and can handle the packet accordingly. The packet processor 300 can include a packet parser 330, a key constructor 340 that can construct a key employing ranges, such as using a range vector, a reduced entry rule tester 350 that can include a rule with reduced entries, and a packet handler 370. These elements can be coupled together as shown in FIG. 3.

The packet parser 330 can receive a packet, extract packet parameters, and send the packet parameters to the key constructor 340. The key constructor 340 can identify a policy regarding handling of a packet and can construct a search key according to selected packet parameters. Then, the search key can be used by the reduced entry rule tester 350 to compare with rule conditions of a set of rules to find a rule that the search key satisfies the rule conditions. Further, a rule action can be executed by the packet handler 370 to handle the packet accordingly.

The packet parser 330 can receive a packet, and parse the packet according to various layers of communication protocols. Generally, a packet can include various parameters in the packet header according to the communication protocols. Such parameters can include source address, destination address, VLAN identification, source TCP/UDP port identification, destination TCP/UDP port identification, operations that are required to be performed on the data, and the like. The packet parser 330 can extract the parameters according to the communication protocols.

The key constructor 340 can receive the extracted parameters from the packet parser 330, and include the extracted parameters in a search key. It can also identify a policy to be applied to a packet based on selected parameters. Further, according to the disclosure, the key constructor 340 can include fields that can be computed from the extracted parameters in the search key. For example, the key constructor 340 may compute a range vector, and include the range vector in the search key. The range vector can indicate ranges among a group of ranges in which a parameter of the packet belongs. In an embodiment, the range vector can use binary bits to indicate which ranges the packet falls into, and which ranges the packet does not fall into. Then, the search key including the range vector can be passed to the rule tester 350.

The reduced entry rule tester 350 can use the search key to identify a rule that the search key satisfies conditions of the rule. The reduced entry rule tester 350 can include hardware based rule searching techniques. For example, the reduced entry rule tester 350 can include a TCAM 345 that can store conditions of the rule as one or more entries of the TCAM 345. Further, according to the disclosure, the TCAM 345 can store a rule including a range condition. For example, an entry of the TCAM 345 can include a range requirement field that stores a range condition vector in association with a group of ranges. In an embodiment, the range condition vector can use ternary bits to indicate ranges which are required for the packet to fall into, ranges which are required for the packet not fall to fall into, and ranges that the rule does not care. Subsequently, the search key can be compared with every entry of the TCAM 345 at the same time to find an entry of a rule, that the search key matches the entry. Then, an action associated with the rule can be executed on the packet. The action can be implemented in software as action instructions stored in a memory. The action instructions can be executed by a processor to perform the action on the packet.

In an embodiment, action instructions can be stored separately from rule conditions to reduce hardware cost. The hardware based rule testing techniques, such as TCAM, can be expensive. For example, a TCAM cell may require 10-12 transistors, while a SRAM cell may require 4-6 transistors, and a DRAM cell may require a single transistor. Therefore, the reduced entry rule tester 350 can include a low cost instruction memory 360, such as SRAM, DRAM, and the like, that can store the action instructions. Additionally, each entry of the TCAM 345 may direct to an address in the instruction memory 360 that stores the associated action instructions. Therefore, when a search key matches an entry, the entry can direct to an address that stores the associated action instructions. Consequently, the associated action instructions can be provided to the packet handler 370.

The packet handler 370 can perform actions, such as forwarding, dropping, and the like, on a packet according to the action instructions. While the packet handler 370 in the example, receives unparsed packet, in another example, the packet handler 370 may receive data of the packet after the packet is parsed, for example via connection 331. Therefore, the packet handler 370 may also encapsulate the data with control parameters into an outgoing packet.

During operation, the packet processor 320 can receive a packet. The packet can be buffered at the packet handler 370 waiting for action instructions. Meanwhile, the packet parser 330 can extract selected parameters out of the packet, and send the extracted parameters to the key constructor 340. The key constructor 340 can then construct a search key based on the extracted parameters or the extracted parameters in combination with additional information. Further, the search key can be provided to the reduced entry rule tester 350. The reduced entry rule tester 350 can store rule conditions including one or more range conditions with a reduced number of hardware entries according to the disclosure. In an embodiment, the reduced entry rule tester 350 can include a TCAM 345. The TCAM 345 can store rule conditions as one or more TCAM entries. The search key can be compared to all the TCAM entries at the same time to find a matching entry. The matching entry can then direct to an address in the instruction memory 360 that stores the action instructions for processing the packet. The action instructions can then be provided to the packet handler 370 to handle the packet accordingly.

It is noted that the packet parser 330, the key constructor 340 and the packet handler 370 can be implemented as hardware, software, or a combination of hardware and software. In an embodiment, the packet parser 330, the key constructor 340 and the packet handler 370 can be implemented as software stored in a memory, then a CPU can execute the software, and perform the above described functions. In another embodiment, the packet parser 330, the key constructor 340, and the packet handler 370 can be implemented in an application specific integrated circuit (ASIC) to perform the above described functions.

Figure 4:
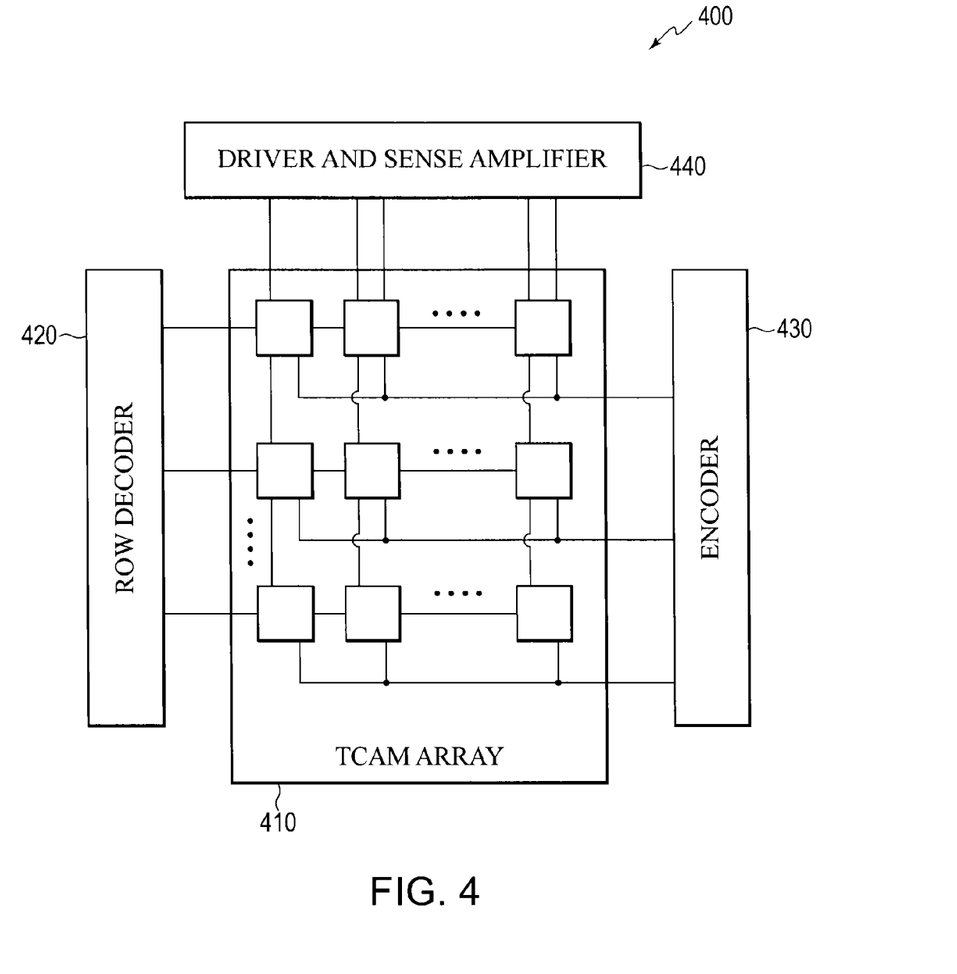
FIG. 4 shows an example of a rule tester.

FIG. 4 shows an example of a suitable TCAM that may be employed in an embodiment. Other suitable memory arrays are also contemplated. The TCAM 400 can include a TCAM array 410, a row decoder 420, a driver 440, and an encoder 430. The TCAM array 410 can store rule conditions as one or more entries. The row decoder 420 can decode a writing address, and enable an entry of TCAM array 410 corresponding to the writing address for writing. The driver 440 can drive a search key or data for writing. The encoder 430 can output an address corresponding to an entry that the search key matches.

The TCAM 400 can be configured to various modes, including a writing mode, and a searching mode. During the writing mode, an entry address can be decoded by the row decoder 420 to enable an entry corresponding to the entry address for writing. The driver 440 can drive data for writing. Thus, the data can be stored at the entry corresponding to the entry address. During the searching mode, the driver 440 can drive a search key. The search key can be compared with every entry of the TCAM at the same time to search for a matching entry. Then the encoder 430 can encode the searching result into an address corresponding to the matching entry, and output the address.

Figure 5:
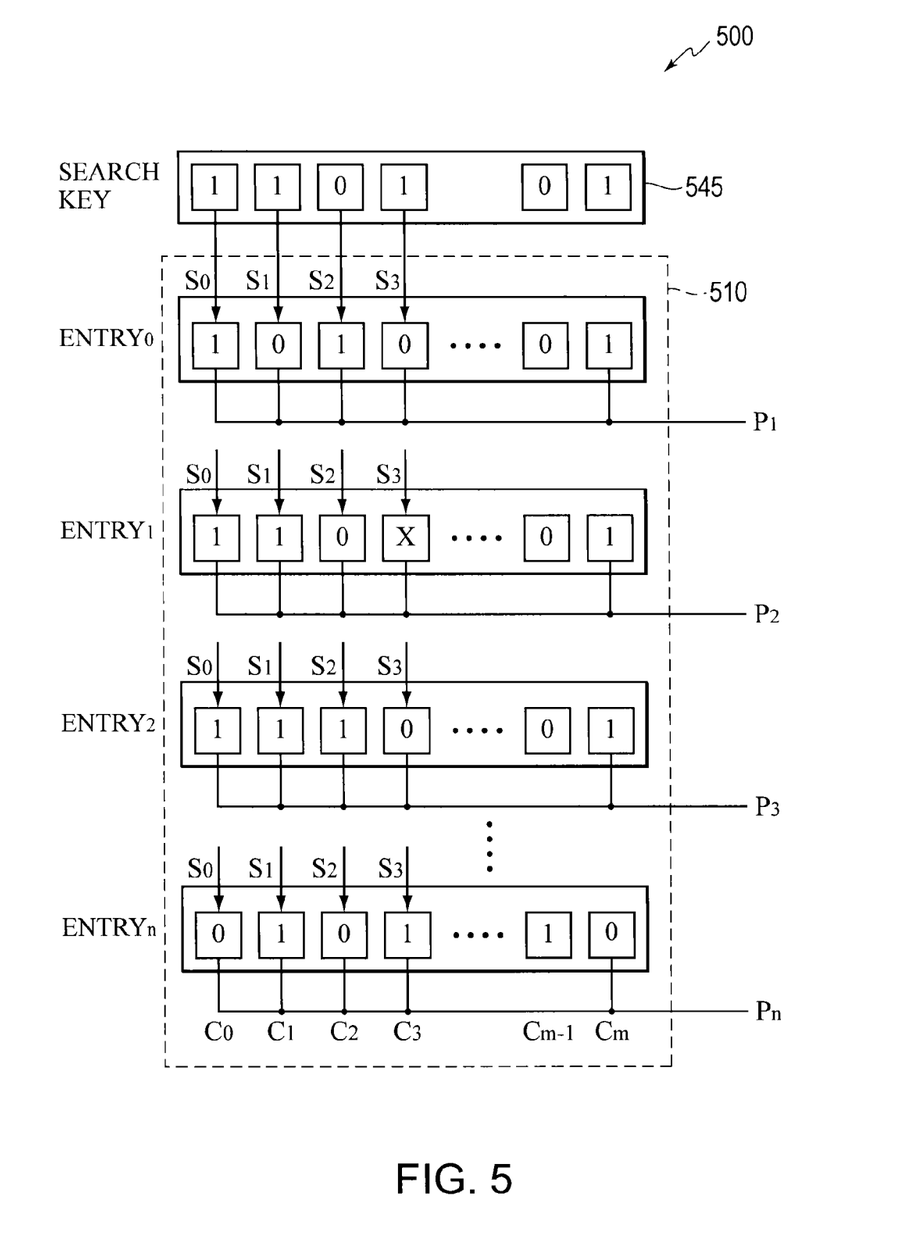
FIG. 5 shows an example of a TCAM array.

FIG. 5 shows a simplified example of a suitable TCAM array that may be employed in an embodiment. Other suitable memory arrays are also contemplated. The TCAM array 510 can include a plurality of entries, such as Entry$_0$-Entry$_n$. Each entry can include a number of TCAM cells, such as $C_0$-$C_m$. Each TCAM cell can store a ternary value of "0", "1", or "x". The "x" value can mean the system does not care, therefore the "x" value can match both "1" and "0". The TCAM cells can be grouped into fields, such as source port field, destination port field, range condition vector field, and the like. In addition, a search key driving circuit 545 can drive a search key in the form of a binary array. Each element of the search key can be coupled with a corresponding TCAM cell in each entry. For example, $S_0$ of the search key can be coupled to $C_0$ of each entry. During a searching mode, the search key element can be compared with the coupled TCAM cell in every entry at the same time. When the search key element and the coupled TCAM cell are of the same value, or when the coupled cell is "x", the search key element matches the TCAM cell. When every search key element matches the coupled TCAM cell of an entry, the search key matches the entry.

In an embodiment, each TCAM cell may include a first and a second RAM cells, such as DRAM, SRAM, and the like. The first RAM cell can store a binary value "0" or "1", and the second RAM cell can store a binary mask value to indicate whether care or not care the binary value in the first RAM cell. For example, the second RAM cell can store "1" to indicate not care, and store "0" to indicate care the binary value in the first RAM cell. Therefore, the TCAM cell can be configured to one of three states. For example, when the second RAM cell stores "1", the TCAM cell can be in a state of "x", when the second RAM stores "0" and the first RAM stores "0", the TCAM cell can be in a state of "0", and when the second RAM stores "0" and the first RAM stores "1", the TCAM cell can be in a state of "1". The first and the second RAM cells of a TCAM entry can be laid out in various manners. In one example, the TCAM entry can be laid out into two lines, a line of the first RAM cells and a line of the second RAM cells.

Each entry can have a search output, such as $P_0$-$P_n$. The search output can be configured to have a different electrical property when the search key matches the entry. For example, the search output can be pre-charged to a high voltage level. When a search key element does not match the coupled entry cell, a discharging path can be switched on. Subsequently, the search output voltage level can be reduced. Alternatively, when each search key element matches corresponding cell of an entry, no discharging path is switched on. Therefore, the voltage level of the search output can be kept high.

Generally, an encoding technique, such as a prefix-expansion technique, can be used to include range conditions as one or more TCAM entries. The prefix-expansion technique can use a prefix "x", which is don't care to match both "0" and "1" at a bit position. For example, a range condition [12, 13] of field $C_0$-$C_3$ can be prefix-expanded into one TCAM entry, which is shown by Entry$_1$. A range condition [12, 14] can be prefix-expanded into two TCAM entries, which are shown by a combination of Entry$_1$ and Entry$_2$ in FIG. 5. In another example, a range condition [1, 65534] of a 16-bit field may be prefix-expanded into 30 entries. In addition, when a rule has more than one range field, the required entry number can increase dramatically. For example, in a worst case, a rule having two 16-bit field may require 30×30=900 prefix-expanded entries. Thus, a large number of TCAM entries can significantly increase hardware cost.

The disclosure can provide a method that can reduce the number of TCAM entries for rules that may include one or more range conditions. According to the disclosure, a range condition vector can be included in an entry. The range condition vector of the entry can correspond to a group of ranges, such as a group of ranges in association with a VLAN in a policy, a group of ranges in association with TCP port, and the like. In addition, a range vector can be included in a search key. The range vector in the search key can also correspond the group of ranges, such as the group of ranges in association with a VLAN in a policy. For example, a packet switching device may include a policy, which may further include a set of rules, that can associate with a VLAN. One or more rules can include one or more range conditions. Therefore, the VLAN can be associated with a group of ranges of the range conditions. Further, a TCAM entry to implement a rule of the policy can include a range condition vector to indicate which ranges of the group are the range conditions for the rule.

Further, a packet that belongs to the VLAN, for example, can be received by the packet switching device. The packet switching device can compute a search key based on information carried by the packet. The search key can include a range vector to indicate, which ranges among the group of ranges in association with the VLAN, selected parameters of the packet fall into. Subsequently, the search key can be compared to TCAM entries implementing the rules of the policy. When the range vector of the search key matches a range condition vector of an entry, as well as rest of the search key matches rest of the entry, an action corresponding to the entry can be executed on the packet.

Figure 6:
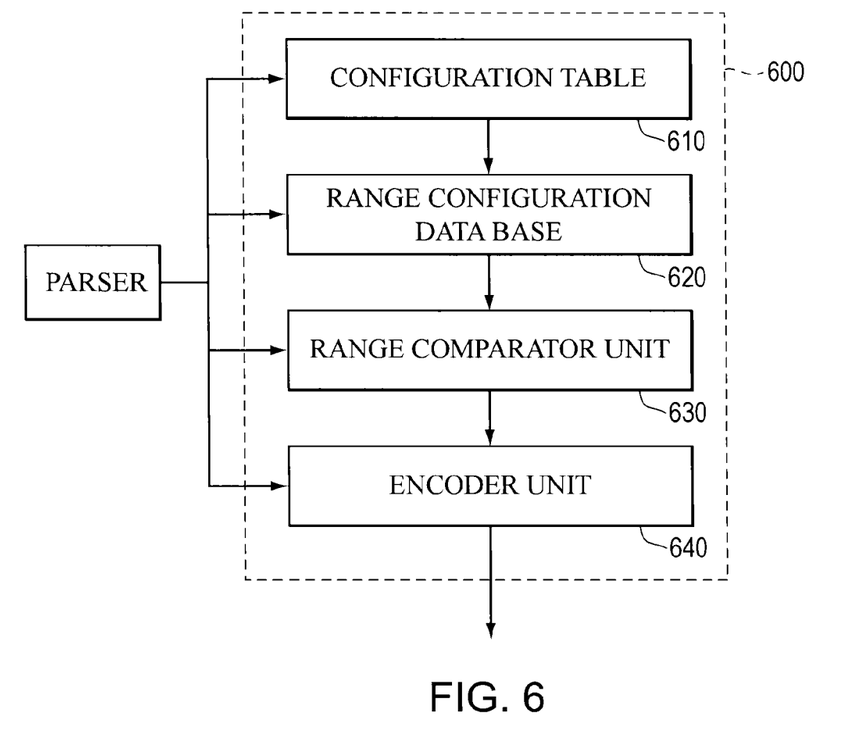
FIG. 6 shows an example of a key constructor.

FIG. 6 shows an example of a key constructor, such as the key constructor 340 in FIG. 3. The key constructor 600 can include a configuration table 610, a range configuration database 620, a range comparator unit 630 and an encoder unit 640. These elements can be coupled together as shown in FIG. 6. The key constructor 600 can be coupled with a parser that can extract packet parameters from a packet. The key constructor 600 can construct a search key based on the extracted packet parameters.

The configuration table 610 can include a look-up table that can identify a packet, for example, in association with a VLAN, and accordingly direct to a configuration in the range configuration database 620. The range configuration database 620 can store various configurations based on information carried by packets, such as VLAN identification, protocol, and the like. Each configuration may include a group of ranges. In an embodiment, the configuration table 610 may include policy control list (PCL) identifications. Therefore, the configuration table 610 and the range configuration data based 620 may cooperate to identify a group of parameter ranges that is predetermined to be bounded with a policy based on a PCL identification of the policy.

The range comparator unit 630 can compare a packet with a group of ranges to determine a relationship of the packet to the group of ranges, such as whether a parameter of the packet, for example a port number, is within one of the ranges. The encoder 640 can encode the relationship along with other parameters, such as transport protocol, source port, destination port, and the like, into a search key.

Figure 7:
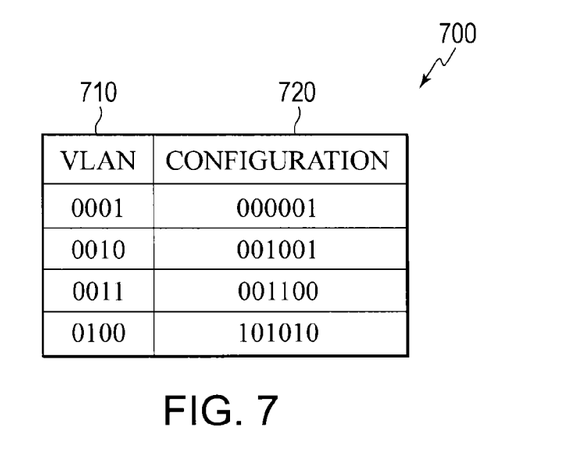
FIG. 7 shows an example of a configuration table.

FIG. 7 shows an example of configuration table where a configuration is identified as a function of a VLAN. The configuration table 700 can include a VLAN identification field 710, and a configuration field 720. Each record (row) can include a VLAN identification and a corresponding configuration. Thus, the configuration table 700 can receive a VLAN identification and output a configuration corresponding to the VLAN identification. The configuration can direct to a group of ranges that can be stored in a range configuration database.

Figure 8:
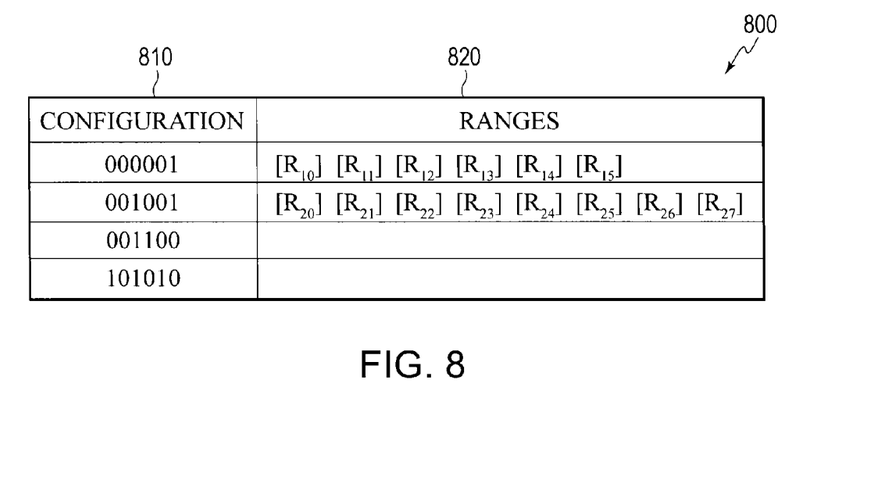
FIG. 8 shows an example of a range configuration database.

FIG. 8 shows an example of a range configuration database 800. The range configuration database 800 can include a configuration field 810 and a range field 820. Each record (row) can include a configuration and a group of ranges corresponding to the configuration. Thus, the range configuration database 800 can receive a configuration, and output groups of ranges of a parameter corresponding to the configuration. Further, relevant parameters of an ingress packet can be compared to the groups of ranges.

Figure 9:
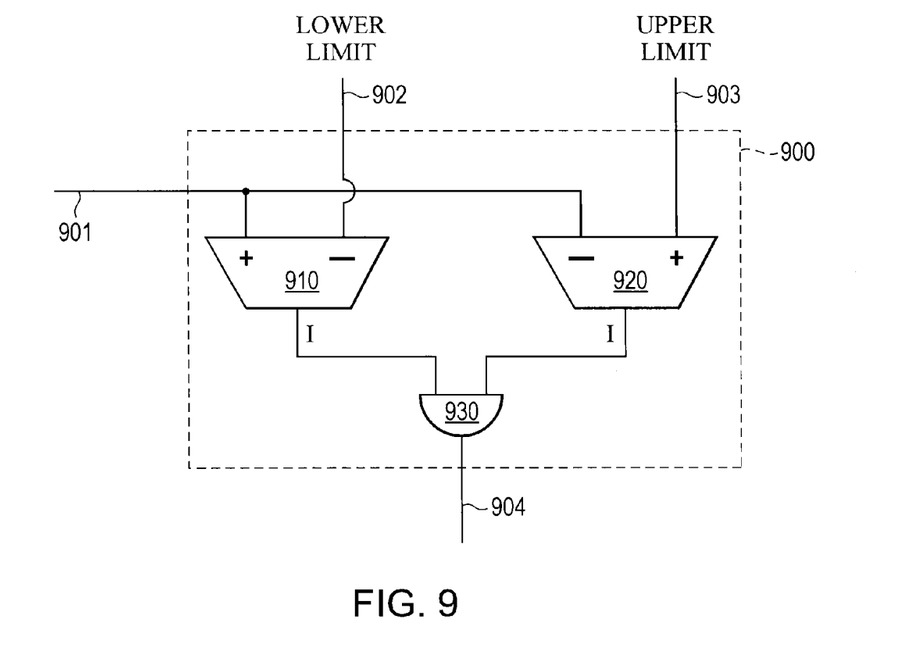
FIG. 9 shows an example of a range comparator.

FIG. 9 shows an example of a range comparator that can compare a packet parameter and a range to determine if the number, for example a port number, belongs to the range. The range comparator 900 can receive a packet parameter 901, for example a source or destination port number, and a range of the parameter defined by a lower limit 902 and an upper limit 903. Further, the range comparator 900 can compare the packet parameter 901 with the lower limit 902 and the upper limit 903, and output a result 904 to indicate whether the packet parameter 901 falls in the range defined by the lower limit 902 and the upper limit 903.

The range comparator 900 can include a first comparator 910, a second comparator 920, and an AND gate 930. The first comparator 910 can compare the packet parameter 901 and the lower limit 902, and output "1" when the packet parameter 901 is larger than or equal to the lower limit. The second comparator 920 can compare the packet parameter 901 and the upper limit 903, and output "1" when the packet parameter 901 is smaller than or equal to the upper limit 903. The AND gate 930 can combine the results from the first comparator 910 and the second comparator 920, and output "1" when both results are "1".

As can be seen, when the packet parameter 901 is within the range defined by the lower limit 902 and the upper limit 903. Both the first comparator 910 and second comparator 920 can output "1", therefore, the range comparator 900 can output "1" indicating that the packet parameter 901 is within the range. When the packet parameter 901 is out of the range, either smaller than the lower limit 902 or larger than the upper limit 903, one of the first and second comparators 910 and 930 can output "0". Therefore, the range comparator 900 can output "0" indicating that the packet parameter 901 is out of the range defined by the lower limit 902 and the upper limit 903. This comparison process can be performed on each of the parameter ranges associated with a packet to establish a range vector that indicate which of the ranges are associated with the packet.

Figure 10:
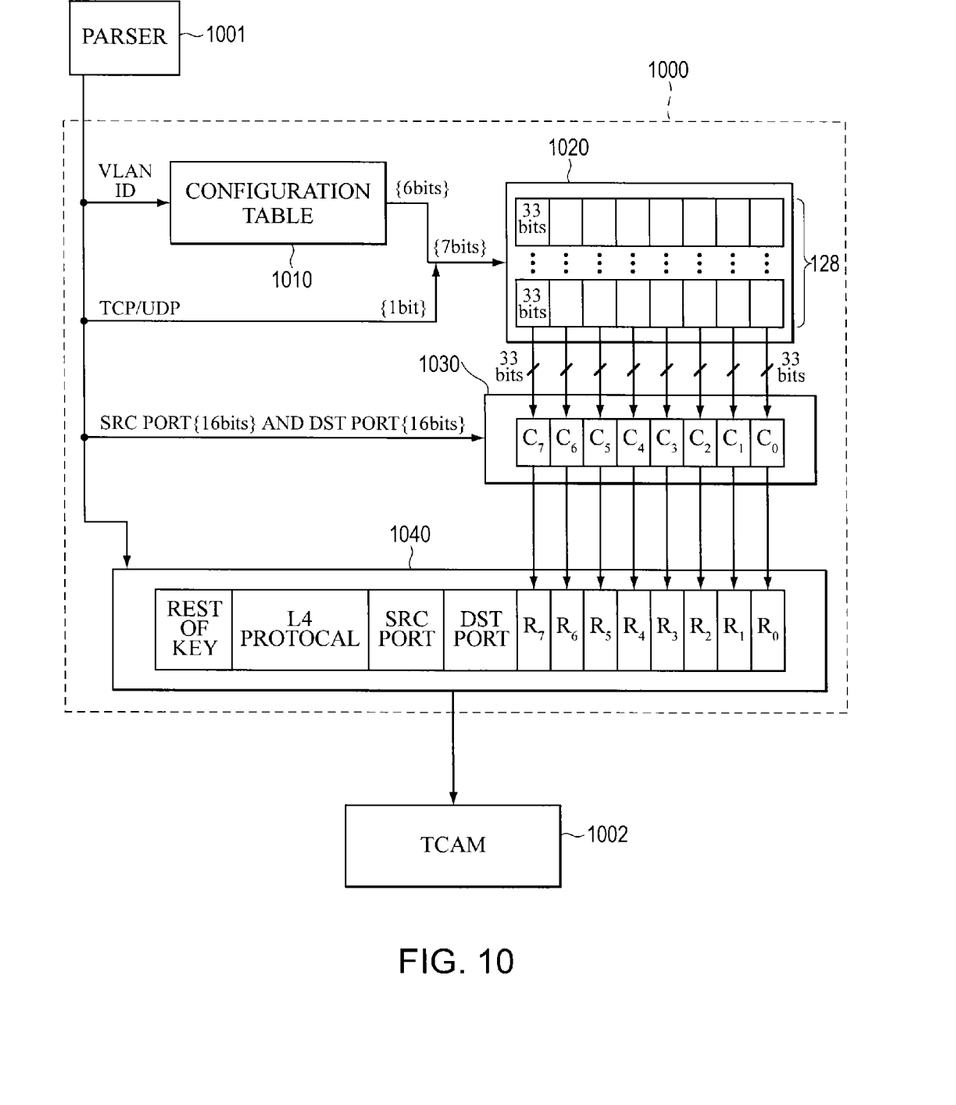
FIG. 10 shows an example of a range based rule application module

FIG. 10 shows a simplified range based rule application module in accordance with an embodiment of the invention. A key constructor 1000 can be coupled with a parser 1001 and a TCAM 1002 as shown in FIG. 10. The key constructor 1000 can receive packet parameters from the parser 1001 that can parse selected parameters of an ingress packet, construct a search key, and provide the search key to the TCAM 1002 to search for a matching entry.

The key constructor 1000 can include a configuration table 1010, a configuration database 1020, a range comparator unit 1030, and an encoder 1040. These elements can be coupled together as shown in FIG. 10.

The configuration table 1010 can correspond a packet identifier, such as VLAN identification, with a 6-bit configuration, for example. The 6-bit configuration can be combined with 1-bit indicating a protocol type, such as TCP or UDP, to form a 7-bit configuration. The 7-bit configuration can direct to a group of ranges in the configuration database 1020.

In the example shown in FIG. 10, the configuration database 1020 can include up to 128 configurations. Each configuration can include up to 8 ranges of parameters, for example. Each range can include 33 bits, for example. Among the 33 bits, 16 bits can be upper limit of the range, 16 bits can be lower limit of the range, and one bit can indicate range type, such as source port range or destination port range. Therefore, the configuration database 1020 can output a configuration including up to 8 ranges of parameters, for example a source or destination port. These quantities of configurations and ranges are contemplated.

The range comparator 1030 can include 8 range comparators $C_0$-$C_7$. A range comparator of the $C_0$-$C_7$ can receive a 33-bit range from the configuration database 1020. According to the 1 bit indicating for example, source or destination port within the 33-bit range, the range comparator 1030 can choose a port number. Then the range comparator 1030 can compare the port number with the 16 bits upper limit and the 16 bits lower limit of the 33-bit range, and output a binary bit for each of the up to 8 ranges to indicate in a determinative manner whether the port number of the ingress packet belongs to the one or more 33-bit ranges. It is noted that each of the ranges, for example 8 ranges in the currently described embodiment, may be overlapping or discrete.

The encoder 1040 can combine the comparison results from the 8 range comparators $C_0$-$C_7$ into a binary vector, and include the binary vector in the search key along with other search key components, such as TCP/UDP source port, TCP/UDP destination port, and the like. The search key can then be provided to the TCAM 1002 to search for a matching TCAM entry.

Figure 11A:
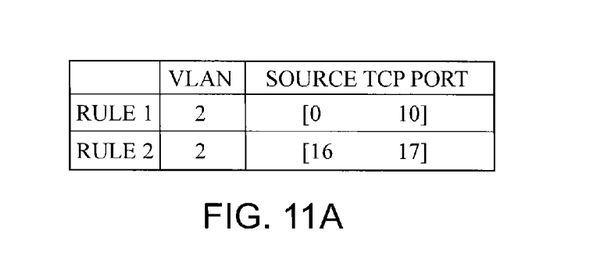
FIGS. 11A-E show examples of rules.

FIGS. 11A-E show examples of policy rules that include parameter ranges in a TCAM. FIG. 11A shows examples of a first rule and a second rule. The first rule and the second rule are both for VLAN 2. The first rule can include a range condition that requires a source TCP port number within [0,10]. The second rule can include a range condition that requires a source TCP port number within [16,17].

As can be seen, the second rule can be implemented by the prefix-expansion technique into one entry, while the first rule may require 3 entries by the prefix-expansion technique. In an embodiment, the second rule can be stored in the TCAM using the prefix-expansion technique, and the first rule can be stored in the TCAM according to the disclosure.

Figure 11B:
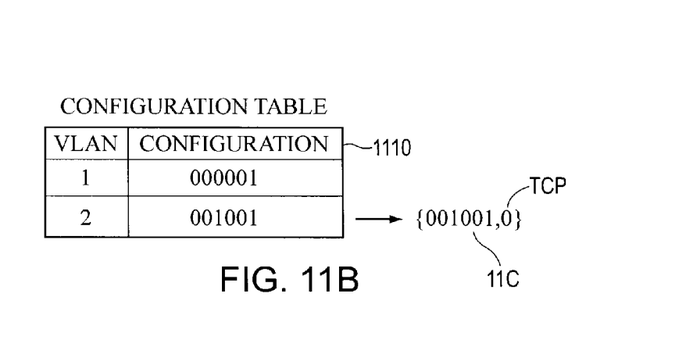

FIG. 11B shows an example of a configuration table. The configuration table 1110 can include a record for VLAN 2. The configuration table 1110 can provide a 6-bit configuration identification for VLAN 2. Further, the 6-bit configuration identification can be combined with 1-bit for TCP protocol to form a 7-bit configuration identification. The 7-bit configuration identification can direct to a configuration in the configuration database.

Figure 11C:
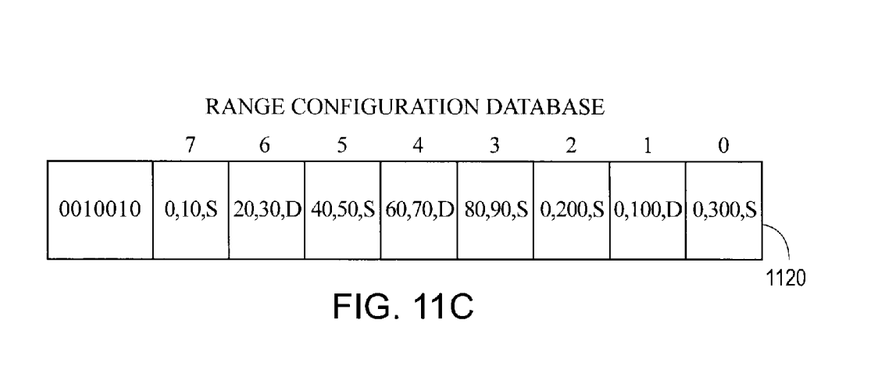

FIG. 11C shows an example of a configuration in a configuration database. The configuration 1120 can include 8 ranges. As can be seen, a $7^{th}$ range can be the range condition of the first rule, which can include a lower limit of 0, an upper limit of 10, and a range type of source port. The configuration 1120 can include other ranges, such as $0^{th}$ to $6^{th}$ ranges, that the first rule may not care.

Figure 11D:
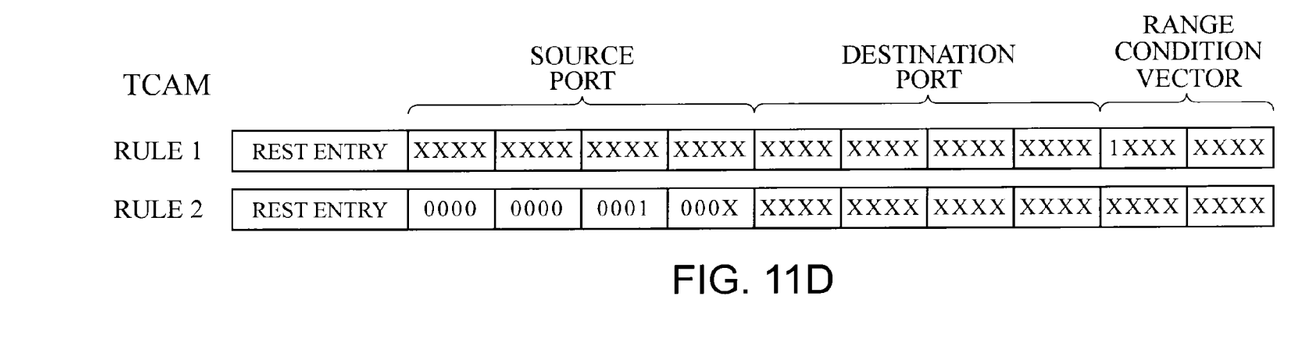

FIG. 11D shows examples of TCAM entries for the first rule and the second rule. As can be seen, the second rule can include a source port field that can match a source port number 16 or 17. On the other hand, the first rule can include a range vector field. The range vector field can include a binary "1" at the $7^{th}$ position, which means the first rule requires the $7^{th}$ range of a corresponding configuration, such as the configuration shown in FIG. 11C. Consequently, the first rule can be stored using 1 TCAM entry instead of 3 TCAM entries. Therefore, rules can be stored in TCAM using a reduced number of entries.

Figure 11E:
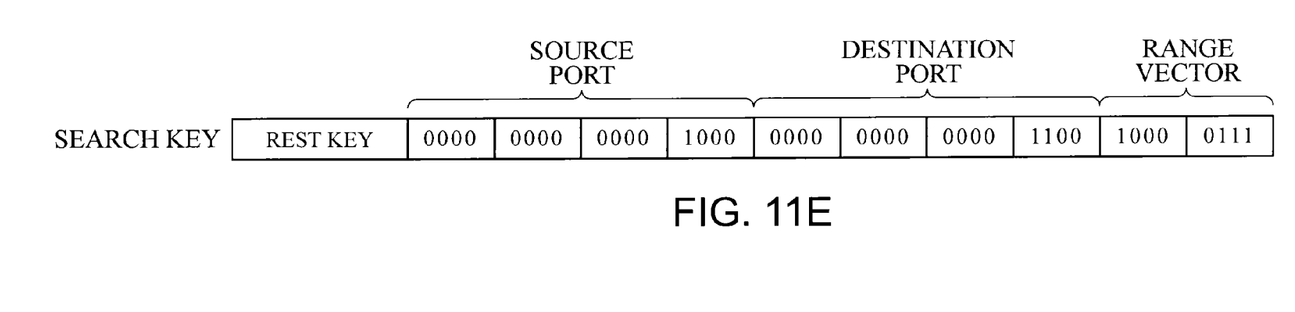

FIG. 11E shows an example of a search key 1140 for a packet. The illustrative packet shown can belong to VLAN 2, and have a source TCP port 8, as well as a destination TCP port 12. According to parameters of the packet, such as the VLAN identification, the protocol type and the like, the configuration database can provide a configuration, such as the configuration shown in FIG. 11C. The source TCP port number and the destination TCP port number can then be compared with ranges of the configuration. Further, the comparison result can be encoded in the search key 1140. The search key 1140 can be compared to entries of the TCAM, such as shown in FIG. 11D. As can be seen, the search key 1140 matches the first rule. Subsequently, an action associated with the first rule can be executed on the packet.

Figure 12:
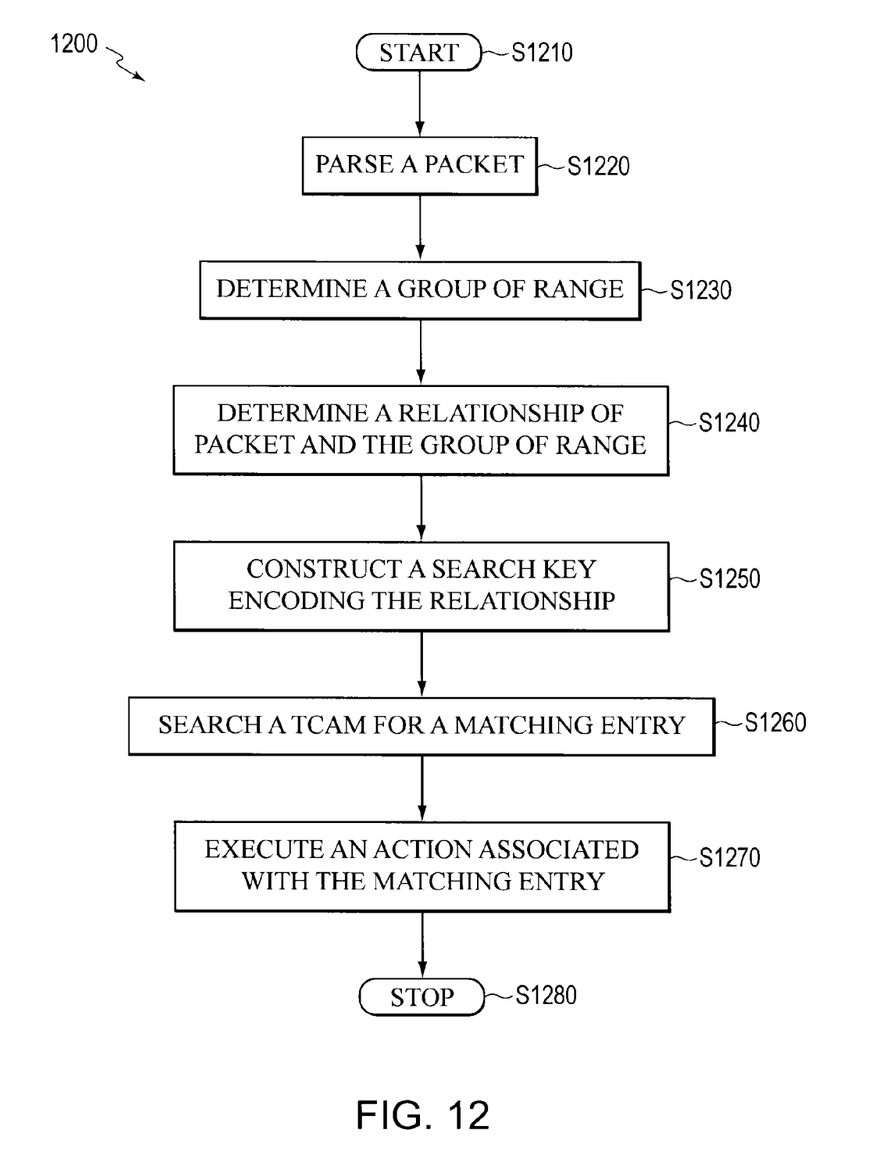
FIG. 12 shows an example of a flowchart outlining a policy applying process.

FIG. 12 shows an example of a flowchart outlining a process for rule testing. The process starts at step S1210, and proceeds to step S1220. In step S1220, a packet can be received by a packet processor. The packet processor can include a parser that can parse the packet to extract packet parameters, such as source address, VLAN identification, source TCP number, and the like. The process then proceeds to step S1230.

In step S1230, a group of ranges related to the packet can be determined. For example, a group of 8 different ranges can be determined based on the VLAN identification. In an embodiment, the packet processor can include a configuration table that can direct to a configuration in a range configuration database according to the VLAN identification. The configuration can include the group of ranges.

Subsequently, the process proceeds to step S1240 where a relationship of the packet and the group of ranges can be determined. For example, a packet parameter, such as source TCP port number, can be compared to the group of ranges to determine which ranges the parameter of the packet falls into.

Further, the process proceeds to step S1250, where a search key can be constructed. The search key can include the relationship of the packet and the group of ranges. For example, the relationship can be encoded in a range vector, and included in the search key.

Then the process proceeds to step S1260, the search key can be used to find a rule that the search key satisfy the rule conditions. As described above, a rule can be stored in a TCAM entry including a range condition vector indicating a relationship of range requirements of the rule and a corresponding group of ranges. Therefore, a reduced number of hardware entries can be required as compared to making TCAM for each parameter values in the range. The search key including the search key range vector can be compared to the reduced number of hardware entries including the range vector to search for an entry that the search key matches the entry. The process then proceeds to step S1270.

In step S1270, an action in association with the rule can be executed on the packet. In an embodiment, the matching entry can direct to an address in an instruction memory that stores action instructions for the rule. Therefore, the action instructions can be executed by a packet handler to handle the packet accordingly. The process can then proceed to step S1280 where the process can be terminated.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A method for packet processing, comprising:
   parsing a packet by a packet parser and forwarding the parsed packet to a key constructor;
   mapping information contained within the parsed packet by the key constructor to parameter ranges, each parameter range including a plurality of parameter fields having upper and lower limits of the parameter range;
   comparing a port number with the upper and lower limits to determine whether the port number belongs to the one of the parameter ranges;
   determining a search key by the key constructor based on the parsed packet and whether a parameter of the parsed packet is within one or more of the parameter ranges;
   determining a rule based on the search key corresponding to the parsed packet and the parameter ranges, the rule including a field, wherein a position of a bit in the field is configured to indicate one of the configurations that is required by the rule; and
   receiving by a packet handler an unparsed packet, and executing an action that is associated with the determined rule on the unparsed packet.

2. The method according to claim 1, wherein the information for selecting the parameter ranges includes a virtual local area network (VLAN) identification.

3. The method according to claim 2, further comprising:
   storing groups of parameter ranges in association with VLAN identifications.

4. The method according to claim 1, wherein determining the search key based on the parsed packet and whether the parameter of the parsed packet is within one or more of the parameter ranges, further comprises:
   comparing the parameter with each parameter range to determine within which of the parameter ranges the parameter belongs.

5. The method according to claim 4, wherein comparing the parameter with the each range of the group to determine within which of the parameter ranges the parameter belongs, further comprises:
   comparing the parameter with the upper limit of the each parameter range;
   comparing the parameter with the lower limit of the each parameter range; and
   determining that the parameter belongs within the parameter range if the parameter is smaller than or equal to the upper limit and larger than or equal to the lower limit.

6. The method according to claim 1, wherein determining the rule based on the search key, further comprises:
   comparing the search key with rules stored in association with the parameter ranges.

7. The method according to claim 6, further comprising:
   storing the determined rules in association with the parameter ranges in a memory unit that includes a ternary content addressable memory (TCAM).

8. The method according to claim 1, wherein the search key includes a range vector including a relationship of the parsed packet and the parameter ranges.

9. The method according to claim 1, further comprising:
   flagging the position by setting the bit as "1" to indicate one of the configurations.

10. An apparatus for packet processing, comprising:
    a packet parser configured to receive and parse packets and forward a parsed packet to a key constructor;

the key constructor configured to map information contained with the parsed packet to parameter ranges, each parameter range including a plurality of parameter fields having upper and lower limits of the parameter range and to construct a search key based on parameters of the parsed packet and indications of ranges among a group of ranges within which a parameter of the parsed packet belongs;

a comparator configured to compare a port number with the upper and lower limits of the parameter range to determine that the port number belongs to one of the parameter ranges;

a rule tester coupled to the key constructor, the rule tester being configured to determine that the search key satisfies a rule, the rule including a field, wherein a position of a bit in the field is configured to indicate one of the configurations that is required by the rule; and a packet handler coupled to the rule tester, the packet handler being configured to receive an unparsed packet, and to execute an action associated with the rule on the unparsed packet.

11. The apparatus according to claim 10, wherein the parameter ranges are associated with the parsed packet based on a virtual local area network (VLAN) identification.

12. The apparatus according to claim 11, wherein the key constructor further comprises:
a first memory configured to store the parameter ranges in association with VLAN identifications.

13. The apparatus according to claim 10, wherein the key constructor further comprises:
at least one range comparator configured to compare the parameter and the parameter ranges.

14. The apparatus according to claim 13, wherein the at least one range comparator further comprises:
a first comparator configured to compare the parameter with an upper limit of a parameter range;
a second comparator configured to compare the parameter with a lower limit of the parameter range; and
a combiner coupled to the first comparator and the second comparator, the combiner being configured to combine comparison results of the first comparator and the second comparator, and determine if the parameter range includes the parameter.

15. The apparatus according to claim 14, wherein the first comparator comprises:
a subtraction unit configured to subtract the parameter with the upper limit of the range.

16. The apparatus according to claim 14, wherein the second comparator comprises:
a subtraction unit configured to subtract the parameter with the lower limit of the range.

17. The apparatus according to claim 10, wherein the rule tester further comprises:
a rule memory configured to store one or more rules in association with the parameter ranges.

18. The apparatus according to claim 17, wherein the rule memory includes a ternary content addressable memory (TCAM).

19. A packet switching device, comprising:
an interface coupled to an outer link, the interface being configured to receive a packet from the outer link; and
a packet processor coupled to the interface to process the packet, the packet processor being configured to further comprise:

a packet parser configured to receive and parse the packet and forward a parsed packet to a key constructor;

the key constructor configured to map information contained with the parsed packet to parameter ranges, each parameter range including a plurality of parameter fields having upper and lower limits of the parameter range and to construct a search key based on parameters of the parsed packet and indications of parameter ranges within which a parameter of the parsed packet belongs;

a comparator configured to select a port number within one of the parameter ranges and compare the selected port number with the upper and lower limits to determine that the selected port number belongs to the one of the parameter ranges;

a rule tester coupled to the key constructor, the rule tester being configured to determine a rule that the search key satisfies the determined rule, the rule including a field, wherein a position of a bit in the field is configured to indicate one of the configurations that is required by the rule; and a packet handler coupled to the rule tester, the packet handler being configured to receive an unparsed packet, and execute an action associated with the determined rule on the unparsed packet.

20. The packet switching device according to claim 19, wherein the parameter ranges are associated with the packet based on a virtual local area network (VLAN) identification.

21. The packet switching device according to claim 20, wherein the key constructor further comprises:
a first memory configured to store parameter ranges in association with VLAN identifications.

22. The packet switching device according to claim 19, wherein the key constructor further comprises:
at least one range comparator configured to compare the parameter and the parameter ranges.

23. The packet switching device according to claim 22, wherein the at least one range comparator further comprises:
a first comparator configured to compare the parameter with an upper limit of a parameter range;
a second comparator configured to compare the parameter with a lower limit of the parameter range; and
a combiner coupled to the first comparator and the second comparator, the combiner being configured to combine comparison results of the first comparator and the second comparator, and determine if the parameter range includes the parameter.

24. The packet switching device according to claim 23, wherein the first comparator comprises:
a subtraction unit configured to subtract the parameter with the upper limit of the parameter range.

25. The packet switching device according to claim 23, wherein the second comparator comprises:
a subtraction unit configured to subtract the parameter with the lower limit of the parameter range.

26. The packet switching device according to claim 19, wherein the rule tester further comprises:
a rule memory configured to store one or more rules in association with the parameter ranges.

* * * * *